United States Patent [19]
Holmgren

[11] Patent Number: 5,393,722
[45] Date of Patent: Feb. 28, 1995

[54] HYDROTHERMALLY STABLE METAL OXIDE SOLID SOLUTIONS

[75] Inventor: Jennifer S. Holmgren, Bloomingdale, Ill.

[73] Assignee: UOP, Des Plaines, Ill.

[21] Appl. No.: 109,557

[22] Filed: Aug. 20, 1993

[51] Int. Cl.$^6$ .............. B01J 21/00; B01J 23/00
[52] U.S. Cl. .................... 502/327; 502/64; 502/306; 502/328; 502/414
[58] Field of Search .......... 502/64, 68, 306, 315, 502/414, 327, 328

[56] References Cited

U.S. PATENT DOCUMENTS

| | | | |
|---|---|---|---|
| 3,796,792 | 3/1974 | Miyata et al. | 423/250 |
| 3,879,523 | 4/1975 | Miyata et al. | 423/250 |
| 3,879,525 | 4/1975 | Miyata et al. | 423/277 |
| 3,990,866 | 11/1976 | Broecker et al. | 48/214 A |
| 4,562,295 | 12/1985 | Miyata et al. | 568/366 |
| 4,642,193 | 2/1987 | Miyata et al. | 210/682 |
| 4,656,156 | 4/1987 | Misra | 502/414 |
| 5,179,063 | 1/1993 | Harris et al. | 502/414 |
| 5,192,725 | 3/1993 | Holmgren | 502/73 |

FOREIGN PATENT DOCUMENTS

| | | | |
|---|---|---|---|
| 1342020 | 5/1971 | United Kingdom | B01J 11/24 |
| 1380949 | 12/1972 | United Kingdom | C01F 7/48 |
| 1380950 | 12/1972 | United Kingdom | C08F 10/004 |

OTHER PUBLICATIONS

F. Cavani et al., *Catalysis Today*, 11, 173-301 (1991), p. 179.

*Primary Examiner*—Carl F. Dees
*Attorney, Agent, or Firm*—Thomas K. McBride; Eugene I. Snyder

[57] ABSTRACT

Ternary metal oxide solid solutions containing permutations of magnesium, nickel, and cobalt with trivalent metals such as aluminum, chromium, gallium, and iron show unusual resistance to rehydration. In addition, the ternary metal oxide solid solutions containing magnesium show unusual basic behavior with small incremental changes in magnesium content, especially where the magnesium represents under about 25 gram atom percent of all divalent metal cations. Such materials show promise as catalysts and adsorbents per se, and also have promise as hydrothermally stable carriers for catalytically active species.

6 Claims, No Drawings

HYDROTHERMALLY STABLE METAL OXIDE SOLID SOLUTIONS

BACKGROUND OF THE INVENTION

Cationic clays are widely distributed in nature and find extensive use in various chemical processes as catalysts and adsorbents. In contrast, anionic clays occur less widely in nature and find only limited use in chemical processes. The interest in anionic clays recently has soared, perhaps in part because of the recognition that their properties are so different and distinct from more common clays as to pique one's scientific curiosity regarding their potential catalytic properties.

Among the anionic clays hydrotalcite is the best known and has the formula $Mg_6Al_2(OH)_{16}CO_3 \cdot 4H_2O$, with manasseite, a polymorph, having the same formula. Pyroaurite and sjogrenite are polymorphs of formula $Mg_6Fe_2(OH)_{16}CO_3 \cdot 4H_2O$. Among other naturally occurring clays having the formula $X_6^{2+}Y_2^{3+}(OH)_{16}CO_3 \cdot 4H_2O$ may be mentioned stichtite and barbertonite, polymorphs with X=Mg and Y=Cr, takovite (X=Ni and Y=Al), reevesite (X=Ni and Y=Fe) and desautelsite (X=Mg and Y=Mn).

Although the foregoing formula is that of the "ideal" structure for hydrotalcite and its related minerals, it has been known for some time that analogous anionic materials more generally have the formula $[M(II)_{1-x}M(III)_x(OH)_2]^{x+}(A^{n-}_{x/n}) \cdot mH_2O$ (F. Cavani et al., *Catalysis Today*, 11, 173–301 (1991), at page 179) where x=0.25, n=2, m=4, and a=CO$_3$ corresponds to the foregoing cases. Using M(II)=Mg, M(III)=Al, and A=CO$_3^=$ as an example, x may vary over a rather broad range of about 0.1 to 0.34, corresponding to a magnesium/aluminum ratio as high as 9 and as low as about 2. We shall refer to materials deviating from the formula for the "ideal" as synthetic hydrotalcites.

In U.S. Pat. Nos. 3,879,523, 3,879,525, and 3,796,792 Miyata et al. describe "composite metal hydroxides having a layer [sic] crystal structure and to a process for the preparation of the same" of formula $$M_x^{2+}M_y^{3+}(OH_{2x+3y-2z}(A^{2-})_z \cdot aH_2O$$

where the divalent metal could be copper, beryllium, calcium, strontium, barium, zinc, cadmium, tin, lead, manganese, magnesium, and metals of Group VIII, and the trivalent metal could be metals of Group III, titanium, metals of Group V, chromium, manganese, metals of Group VIII, the rare earths and actinides. For $Fe_6Al_2(OH)_{16}CO_3 \cdot 4H_2O$ the patentees noted that both differential thermal analysis and thermogravimetric analysis showed a first endotherm at 230° C. corresponding to the loss of 4H$_2$O, with another at 370° C. corresponding to a loss of 8H$_2$O and CO$_2$. Calcining of their materials afforded a spinel structure, and the patentees noted that dehydration was reversible, with the material rehydrating to the layered double hydroxide structure. Miyata et al. also exemplified several ternary systems and in the latter two of the patents cited above the patentees specifically described cases where $M_x$ was magnesium.

In UK 1,380,949 and 1,380,950 the patentees described as carriers for Ziegler-type catalysts materials obtained by heating at 110°–600° C. layered double hydroxides of formula

where x was an integer from 2 to 8, y was an integer from 2 to 4, o was an integer from 12 to 18, and p was 1 or 2, followed by chlorination to a chlorine content of 20–70%. The divalent metal could be beryllium, magnesium, calcium, strontium, barium, manganese, iron, cobalt, nickel, zinc, and cadmium in any combination and the trivalent metal was chromium, iron, aluminum, or gallium in any combination. In UK 1,342,020 the patentees described a subgroup where the divalent metal was manganese, nickel, cobalt, copper, zinc or iron and the trivalent metal was aluminum, chromium, or iron and note that whereas the materials made by calcining and reducing the foregoing layered double hydroxides are valuable hydrogenation catalysts, those treated only by calcination were highly efficient dehydration catalysts. Thus, like Miyata et al. the patentees here teach rehydration of calcined material.

Later Miyata et al. (U.S. Pat. No. 4,642,193) teach that layered double hydroxides, and in particular as to those layered double hydroxides where the divalent metal is magnesium, nickel or zinc and the trivalent metal is selected from aluminum, iron, or chromium, calcination at temperatures up to 900° C. produces a metal oxide solid solution (MOSS)—i.e., a homogeneous material where the trivalent metal dissolves in a divalent metal oxide to form a solid solution—which is again converted to the layered double hydroxide in the presence of water. In fact the patentees use the metal oxide solid solution to purify cooling water and specifically teach their rehydration. In U.S. Pat. No. 4,562,295 Miyata et al. teach binary MOSSs for purifying cyclohexanone containing byproduct organic acids where the divalent metal is magnesium, calcium, zinc, cobalt, nickel, or copper and the trivalent metal is aluminum, iron, chromium, nickel, cobalt, or manganese. Finally, Broecker et al. in U.S. Pat. No. 3,990,866 calcined dried $Ni_5MgAl_2(OH)_{16}CO_3 \cdot 4H_2O$ at 350°–550° C. and reduced the calcined material to one having zerovalent nickel which was subsequently used as a catalyst in the steam cracking of hydrocarbons.

In this application we describe some ternary metal oxide solid solution systems which have some totally unexpected and extremely useful properties. Whereas the totality of the prior art teaches that the MOSSs are rehydratable to the corresponding layered double hydroxide, the ternary MOSSs of our invention are quite resistant to rehydration. This means they can be used in aqueous or partly aqueous systems for extended periods of time without any physicochemical changes in the system where they are employed, which is important in, for example, circumstances where metal oxide solid solutions exhibit catalytic or adsorbent properties different from, or absent in, layered double hydroxides, or where the metal oxide solid solution is an effective carrier (support) for catalytically active species incompatible with layered double hydroxides, or where the catalytically active species manifests different activity when composited on the layered double hydroxides than on the MOSS.

Additionally, some ternary MOSSs of our invention show unexpected non-linear basic properties upon introduction of a ternary metal. For example, in a system of formula $Z_6Al_2O_8(OH)_2$ (vide infra) where the divalent ion Y is substituted for the divalent cation Z,

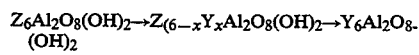

and $Y_6Al_2O_8(OH)_2$ is substantially more basic than $Z_6Al_2O_8(OH)_2$ one would expect the basicity to change linearly with increasing amounts of Y. In fact, in some of these systems we have observed that the basicity changes most rapidly with the introduction of relatively small amounts of Y. This affords one the opportunity of effecting significant changes in basicity while effecting only minor changes in other MOSS characteristics.

SUMMARY OF THE INVENTION

The purpose of this invention is to provide ternary metal oxide solid solutions which are resistant to hydration. An embodiment is a metal oxide solid solution of the formula $A_aB_bC_c)_{(a+b+c)}(OH)_c$, where A and B are permutations of divalent metal cations, where the divalent metal is selected from the group consisting of magnesium, nickel, and cobalt and where C is a trivalent metal cation where the metal is selected from the group consisting of aluminum, chromium, gallium, and iron. In a more specific embodiment A and B are magnesium and nickel, respectively, C is aluminum, and the magnesium represents from 5 to 50 atom percent of the total divalent metal cations. In a still more specific embodiment magnesium represents from 5 to 25 atom percent of the total divalent metal cations. In another embodiment A and B are magnesium and cobalt, respectively, C is aluminum, and magnesium represents from 5-25 atom percent of the divalent metal cations. Other embodiments will be clear from the ensuing description.

DETAILED DESCRIPTION OF THE INVENTION

We have found that certain ternary metal oxide solid solutions are quite resistant to rehydration, contrary to prior art teachings. Since MOSSs already are thermally stable, the ternary MOSSs of our invention are hydrothermally stable materials. Hydrothermal stability often is lacking in materials such as gamma-alumina, thus the ternary MOSSs of this invention have great promise as a carrier or support for catalytically active species used in aqueous systems at elevated temperatures. Their resistance to rehydration also means that catalytic activity attributable to the MOSS itself will not change in aqueous systems owing to conversion of the MOSS to a layered double hydroxide with a distinctly different catalytic activity. Additionally, it has been observed that ternary MOSSs manifest large changes in their basic properties upon incorporation of magnesium as a divalent cation, making it possible to tailor the basicity of MOSSs while leaving other characteristics largely untouched.

The ternary metal oxide solutions of this invention may be represented by the formula

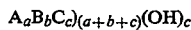

$$A_aB_bC_c)_{(a+b+c)}(OH)_c$$

where A and B represent divalent metal cations and C represents a trivalent metal cation, or some combination of trivalent metal cations. Representing the formula of our metal oxide solid solutions in this way clearly points out their basic character. The divalent metal cations used in the compositions of our invention are magnesium, nickel, and cobalt. Among the trivalent metal cations may be mentioned those of aluminum, chromium, gallium, and iron, in any combination, along with the trivalent lanthanides in combination with aluminum or gallium. The lanthanide metals are those of atomic number from 57 through 71 with lanthanum and cerium being the most important members of this group.

The subscripts a, b, and c represent the relative number of gram atoms of the cations A, B, and C, respectively. For the metal oxide solid solutions of our invention (a+b)/c ranges from about 1.5 up to about 5. That is, the relative number of gram atoms of the divalent metals are from about 1.5 up to about 5 times that of the trivalent metal. This ratio is independent of the nature of A or B. On the other hand, the range of values of the ratio a/(a+b) does vary with the nature of the divalent metals since some characteristics of the resulting ternary MOSS are sensitive to the relative amounts of the divalent metals. For example, where A=magnesium and B=nickel, it is found that the ternary MOSS is quite resistant to rehydration at a nickel content of about 50 atom percent of the total divalent metal present and higher, although the ternary MOSS having even 5 atom percent nickel relative to the total of magnesium and nickel is resistant to rehydration relative to the MOSS where magnesium is the sole divalent metal. Similar characteristics are exhibited by the MOSS where A is magnesium and B is cobalt. Where A is cobalt and B is nickel the MOSS is hydration-resistant over the entire range of cobalt content, although values of a/(a+b) from 0.05 to 0.95 (5-95 atom percent cobalt relative to the total of cobalt and nickel) are preferred. The combination of unusual basicity (vide infra) and hydration resistance for the Mg-containing MOSSs make the preferred range of a(a+b) from 5 to 50 atom percent where A=Mg and B=Ni and from 5-75 atom percent where A=Mg and B=Co. In the Mg/Ni/Al system the dramatic increase in basicity with the incorporation of small amounts of Mg make the range $0.05 \leq Mg/Mg+Ni \leq 0.25$ especially interesting, which is also the case for Mg/Co/Al.

Where A is magnesium, the basicity increases quickly with the introduction of magnesium. In all cases basicity was measured by the conversion of acetonylacetone to methylcyclopentane as described by R. M. Dessau, Zeolites, 10, 205 (1990). For example, in the case where B is nickel and C is aluminum, where there is no magnesium the material is about 14% as basic as the MOSS containing 100% magnesium as the divalent metal. On the other hand, increasing the magnesium content from 0 to 5 gram atom percent increases the basicity (relative to the all-magnesium system) from 14 to 52%; increasing the magnesium to 25% increases the basicity to 62%. Similar large increases in basicity with the addition of small amounts of magnesium is noted in the magnesium/cobalt/aluminum metal oxide.

The preparation of our metal oxide solid solutions starts from layered double hydroxides of formula

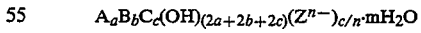

$$A_aB_bC_c(OH)_{(2a+2b+2c)}(Z^{n-})_{c/n} \cdot mH_2O$$

where $Z^{n-}$ is an anion, conveniently $CO_3^=$, and $mH_2O$ is water of hydration. These layered double hydroxides are prepared by mixing aqueous solutions of suitable salts of A, B, C preferably at a temperature between about 0° and 10° C. to afford a precursor gel. Suitable salts of the metals in question include nitrates, carbonates, and sulfates. Other salts also may be used, especially those which decompose on calcination, such as hydroxide and carboxylic acid salts. Addition is performed at a pH of from about 9 up to about 14 and when addition is complete the mixture is stirred at a temperature generally between about 50° and about 80° C. for times which are typically on the order of 1 to about 24 hours. The layered double hydroxides which form are then collected, washed well with water, and dried, often at a temperature of about 100° C.

The ternary metal oxide solid solutions of this invention are then prepared by calcination of the layered double hydroxide at temperatures between about 400° and about 750° C. for a time from about 1 to about 16 hours. The unusual stability of the solid solutions of a divalent metal oxide and a trivalent metal oxide prepared according to the foregoing procedure is evidenced by the fact that spinel formation is not seen until calcination temperatures of about 800° C., whereas in the prior art the spinel phase begins to appear at a calcination temperature of about 600° C. In addition, the MOSSs of our invention show greater product homogeneity as evidenced, by the resistance to spinel formation.

The metal oxide solid solutions of this invention may be used .per se or they may be employed as a carrier for catalytically active species. A limitation may arise in the use of our material because of the propensity of both nickel and, to a somewhat lesser degree, of cobalt to be reduced to the zerovalent state in a reductive atmosphere, especially in the presence of hydrogen. In such cases the support initially is a metal oxide solid solution of the type described above but is transformed to one where at least some of nickel and/or cobalt is reduced to its metallic state, hence the support itself undergoes both a physical or chemical change which often makes the MOSSs of our invention unsuitable as a carder or support. Restricting our attention to those cases where there is no reductive environment and where the nickel and/or cobalt is unaffected, the MOSSs of this invention may find utility as a support for such catalytically active metals as molybdenum, vanadium, copper, chromium, manganese, silver, and titanium, especially where the foregoing are in an upper valence state and are used to facilitate oxidation. Examples of suitable valence states include Mo(VI), V(V), Cu(II), Cr(VI), Mn(VII), Mn(VI), and Ti(IV). The materials of our invention also may be used as a support for zeolites or molecular sieves of various types. For example, they may be used as a carrier for titanium silicalites to provide a potent oxidation catalyst in a basic environment. The MOSSs of our invention also may be used as a binder for zeolites and molecular sieves, much as alumina is currently used as a binder. We anticipate that the metal oxide solid solutions of our invention will find increasing use as a support for various materials, especially when their resistance to rehydration is a requisite feature.

The following examples are merely illustrative of our invention and do not limit it in any particular way.

EXAMPLE 1

Preparation of Mg/Ni/Al MOSSs 1. 5% Mg. A 2 L, 3-necked round bottomed flask was equipped with a reflux condenser, a thermometer, a mechanical stirrer, and a Glass Col heating mantle. To this 3-neck flask was added a solution containing 585 g of water, 60 g of $Na_2CO_3 \cdot H_2O$ and 71 g of NaOH. This flask was cooled to $<5°$ C. An addition funnel was charged with a solution of 375 g water, 6.5 g $Mg(NO_3)_2 \cdot 6H_2O$, 139 g $Ni(NO_3)_2 \cdot 6H_2O$ and 93 g $(Al(NO_3)_3 \cdot 9H_2O$. The addition funnel was put in place of the reflux condenser. This solution was added over a period of 4 hours. The solution temperature was maintained at $<5°$ C. throughout the addition. This slurry was stirred for 1 hour at $<5°$ C. The addition funnel was removed and the reflux condenser replaced. This solution was heated to 60° C.$\pm 5°$ C. for 1 hour. The slurry was then cooled to room temperature and the solids recovered by filtration. The solids were washed with 10 L of hot DI water. The solids were then dried at 100° C. for 16 hours. This product was characterized as hydrotalcite by its XRD pattern. After crushing, the solid was calcined at 450° C. for 12 hours in a muffle furnace with an air flow. This product was characterized as a $MgO-NiO-Al_2O_3$ solid solution by XRD. The BET surface area for this material was 205 m²/g. Alternatively, the hydrotalcite slurry/paste can be extruded prior to drying and calcining.

2. 25% Mg. A 2 L, 3-necked round bottomed flask was equipped with a reflux condenser, a thermometer, a mechanical stirrer, and a Glass Col heating mantle. To this 3-neck flask was added a solution containing 585 g of water, 60 g of $Na_2CO_3 \cdot H_2O$ and 71 g of NaOH. This flask was cooled to $<5°$ C. An addition funnel was charged with a solution of 378 g water, 32.5 g $Mg(NO_3)_2 \cdot 6H_2O$, 110 g $Ni(NO_3)_2 \cdot 6H_2O$ and 93 g $Al(NO_3)_3 9H_2O$. The addition funnel was put in place of the reflux condenser. This solution was added over a period of 4 hours. The solution temperature was maintained at $<5°$ C. throughout the addition. This slurry was stirred for 1 hour at $<5°$ C. The addition funnel was removed and the reflux condenser replaced. This solution was heated to 60° C.$\pm 5°$ C. for 1 hour. The slurry was then cooled to room temperature and the solids recovered by filtration. The solids were washed with 10 L of hot DI water. The solids were then dried at 100° C. for 16 hours. This product was characterized as hydrotalcite by its XRD pattern. After crushing, the solid was calcined at 450° C. for 12 hours in a muffle furnace with an air flow. This product was characterized as a $MgO-NiO-Al_2O_3$ solid solution by XRD. The BET surface area for this material was 199 m²/g. Alternatively, the hydrotalcite slurry/paste can be extruded prior to drying and calcining.

3. 50% Mg. A 2 L, 3-necked round bottomed flask was equipped with a reflux condenser, a thermometer, a mechanical stirrer, and a Glass Col heating mantle. To this 3-neck flask was added a solution containing 592 g of water, 60 g of $Na_2CO_3 \cdot H_2O$ and 71 g of NaOH. This flask was cooled to $<5°$ C. An addition funnel was charged with a solution of 375 g water, 65 g $Mg(NO_3)_2 \cdot 6H_2O$, 73.5 g $Ni(NO_3)_2 \cdot 6H_2O$ and 93 g $Al(NO_3)_3 \cdot 9H_2O$. The addition funnel was put in place of the reflux condenser. This solution was added over a period of 4 hours. The solution temperature was maintained at $<5°$ C. throughout the addition. This slurry was stirred for 1 hour at $<5°$ C. The addition funnel was removed and the reflux condenser replaced. This solution was heated to 60° C.$\pm 5°$ C. for 1 hour. The slurry was then cooled to room temperature and the solids recovered by filtration. The solids were washed with 10 L of hot DI water. The solids were then dried at 100° C. for 16 hours. This product was characterized as hydrotalcite by its XRD pattern. After crushing, the solid was calcined at 450° C. for 12 hours in a muffle furnace with an air flow. This product was characterized as a $MgO-NiO-Al_2O_3$ solid solution by XRD. The BET surface area for this material was 212 m²/g. Alternatively, the hydrotalcite slurry/paste can be extruded prior to drying and calcining.

EXAMPLE 2

Preparation of Co/Ni/Al MOSS (20% Co)

A 2 L, 3-necked round bottomed flask was equipped with a reflux condenser, a thermometer, a mechanical stirrer, and a Glass Col heating mantle. To this 3-neck flask was added a solution containing 618 g of water, 58 g of $Na_2CO_3 \cdot H_2O$ and 72 g of NaOH. This flask was cooled to <5° C. An addition funnel was charged with a solution of 342 g water, 35 g $Co(NO_3)_2 \cdot 6H_2O$, 139 g $Ni(NO_3)_2 \cdot 6H_2O$ and 75 g $Al(NO_3)_3 \cdot 9H_2O$. The addition funnel was put in place of the reflux condenser. This solution was added over a period of 4 hours. The solution temperature was maintained at <5° C. throughout the addition. This slurry was stirred for 1 hour at <5° C. The addition funnel was removed and the reflux condenser replaced. This solution was heated to 60°±5° C. for 1 hour. The slurry was then cooled to room temperature and the solids recovered by filtration. The solids were washed with 10 L of hot DI water. The solids were then dried at 100° C. for 16 hours. This product was characterized as hydrotalcite by its XRD pattern. After crushing, the solid was calcined at 450° C. for 12 hours in a muffle furnace with an air flow. This product was characterized as a $CoO-NiO-Al_2O_3$ solid solution by XRD. The BET surface area for this material was 209 m$^2$/g. Alternatively, the hydrotalcite slurry/paste can be extruded prior to drying and calcining.

EXAMPLE 3

Preparation of Co/Mg/Al MOSSs 1. 5% Co. A 2 L, 3-necked round bottomed flask was equipped with a reflux condenser, a thermometer, a mechanical stirrer, and a Glass Col heating mantle. To this 3-neck flask was added a solution containing 610 g of water, 60 g of $Na_2CO_3 \cdot H_2O$ and 102 g of NaOH. This flask was cooled to <5° C. An addition funnel was charged with a solution of 436 g water, 9 g $Co(NO_3)_2 \cdot 6H_2O$, 156 g $Mg(NO_3)_2 \cdot 6H_2O$ and 81 g $(Al(NO_3)_3 \cdot 9H_2O$. The addition funnel was put in place of the reflux condenser. This solution was added over a period of 4 hours. The solution temperature was maintained at <5° C. throughout the addition. This slurry was stirred for 1 hour at <5° C. The addition funnel was removed and the reflux condenser replaced. This solution was heated to 60° C.±5° C. for 1 hour. The slurry was then cooled to room temperature and the solids recovered by filtration. The solids were washed with 10 L of hot DI water. The solids were then dried at 100° C. for 16 hours. This product was characterized as hydrotalcite by its XRD pattern. After crushing, the solid was calcined at 450° C. for 12 hours in a muffle furnace with an air flow. This product was characterized as a $MgO-CoO-Al_2O_3$ solid solution by XRD. The BET surface area for this material was 175 m$^2$/g. Alternatively, the hydrotalcite slurry/paste can be extruded prior to drying and calcining.

2. 20% Co. A 2 L, 3-necked round bottomed flask was equipped with a reflux condenser, a thermometer, a mechanical stirrer, and a Glass Col heating mantle. To this 3-neck flask was added a solution containing 610 g of water, 60 g of $Na_2Co_3 \cdot H_2O$ and 102 g of NaOH. This flask was cooled to <5° C. An addition funnel was charged with a solution of 435 g water, 44 g $Co(NO_3)_2 \cdot 6H_2O$, 154 g $Mg(NO_3)_2 \cdot 6H_2O$ and 94 g $Al(NO_3)_3 \cdot 9H_2O$. The addition funnel was put in place of the reflux condenser. This solution was added over a period of 4 hours. The solution temperature was maintained at <5° C. throughout the addition. This slurry was stirred for 1 hour at <5° C. The addition funnel was removed and the reflux condenser replaced. This solution was heated to 60° C.±5° C. for 1 hour. The slurry was then cooled to room temperature and the solids recovered by filtration. The solids were washed with 10 L of hot DI water. The solids were then dried at 100° C. for 16 hours. This product was characterized as hydrotalcite by its XRD pattern. After crushing, the solid was calcined at 450° C. for 12 hours in a muffle furnace with an air flow. This product was characterized as a $MgO-CoO-Al_2O_3$ solid solution by XRD. The BET surface area for this material was 189 m$^2$/g. Alternatively, the hydrotalcite slurry/paste can be extruded prior to drying and calcining.

EXAMPLE 4

Resistance of Metal Oxide Solid Solutions to Rehydration

A 10 weight percent slurry in water of a Mg—Al MOSS from hydrotalcite was stirred at ambient temperature. Samples were removed periodically and examined by x-ray diffraction. Studies showed that rehydration of the MOSS was complete within 6 hours, as evidenced by the fact that at the end of this period the XRD pattern of the material was identical to that of the original layered double hydroxide, and the XRD of the original MOSS had completely disappeared.

For metal oxide solid solutions of the Mg/Ni/Al type there was no measurable rehydration observed at ambient temperature even after 16 hours. Consequently, rehydration was studied at 90° C. instead of ambient temperature. For materials containing at least 75 gram atom percent nickel as the divalent metal there was no change in the XRD pattern, therefore no measurable rehydration, even after 5 days. For MOSSs containing 50 gram atoms percent Ni or less some rehydration was observed after 48 hours, although the extent of rehydration seemed minor. Although the Mg/Co/Al system was not studied as extensively as the Mg/Ni/Al system, the cobalt-containing MOSSs containing above 50 gram atoms percent Co appeared to have a resistance to rehydration similar to that of the corresponding Ni materials. The Co/Ni/Al system is expected to manifest rehydration resistance when it contains as little as 5 atom percent Ni.

EXAMPLE 5

Basicity of Metal Oxide Solid Solutions

The conversion of acetonylacetone to methylcyclopentanone was used to measure basicity by the method of R. M. Dessau, op. cit. The formation of dimethylfuran, formed only in the presence of acid sites, was used as a purity check. The test was run in a Honeywell-controlled atmospheric reactor using MOSS loadings of 50 mg to 1 g and in the vapor phase in a nitrogen atmosphere. Feed acetonylacetone was introduced through a saturator placed in a water bath at 40° C. Results are summarized in Table 1.

TABLE 1

| Relative Basicity of Some Metal Oxide Solid Solutions | |
|---|---|
| System | Relative Basicity$^f$ |
| Mg/Ni/Al$^a$ | |
| % Mg$^b$ 0 | 9 |

TABLE 1-continued

Relative Basicity of Some Metal Oxide Solid Solutions

| System | | Relative Basicity[f] |
|---|---|---|
| | 5 | 34 |
| | 25 | 40 |
| | 50 | 46 |
| | 100 | 65 |
| Mg/Co/Al[c] | | |
| % Mg[b] | 5 | 28 |
| | 25 | 40 |
| | 75 | 58 |
| | 95 | 72 |
| | 100 | 65 |
| Co/Ni/Al[d] | | |
| % Co[e] | 0 | 9 |
| | 5 | 10 |
| | 25 | 10 |

[a] Magnesium-nickel-aluminum MOSS; see Example 1.
[b] Gram atom % Mg relative to all divalent metals.
[c] Magnesium-cobalt-aluminum MOSS; see Example 3.
[d] Cobalt-nickel-aluminum MOSS, see Example 2.
[e] Gram atom % Co relative to all divalent metals.
[f] Relative basicity = percent conversion of acetonylacetone to methylcyclopentanone.

What is claimed is:

1. A ternary metal oxide solid solution of formula

where
a, b, and c are atom fractions of A(II), B(II), and C(III), respectively;
C(III) is a trivalent metal cation whose metal is selected from the group consisting of Al, Cr, Ga, Fe, and combinations thereof, and combinations of Al and metals of atomic number 57 through 71;
A(II) and B(II) are divalent metal cations and
 i. A is Mg, B is Ni, and $0.05 \leq a/(a+b) \leq 0.5$; or
 ii. A is Mg, B is Co, and $0.05 \leq a/(a+b) \leq 0.75$; or
 iii. A is Co, B is Ni, and $0.05 \leq a/(a+b) \leq 0.95$; and $1.5 \leq (a+b)/c \leq 5.0$.

2. A ternary metal oxide solid of Claim 1 where C is aluminum.

3. A ternary metal oxide of Claim 1 where A and B are Mg and Ni, resp., $0.05 \leq a/(a+b) \leq 0.5$, and C is aluminum.

4. A ternary metal oxide of Claim 3 where $0.05 \leq a/(a+b) \leq 025$.

5. A ternary metal oxide of Claim 1 where A and B are Mg and Co, resp., $0.05 \leq a/(a+b) \leq 0.75$, and C is aluminum.

6. A ternary metal oxide of Claim 1 where A and B are Co and Ni, resp., $0.05 \leq a/(a+b) \leq 0.95$, and C is aluminum.

* * * * *